(12) United States Patent
Fukasawa

(10) Patent No.: US 6,665,254 B2
(45) Date of Patent: Dec. 16, 2003

(54) DISK-LOADING APPARATUS

(75) Inventor: Akihiro Fukasawa, Kyoto (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 65 days.

(21) Appl. No.: 10/101,613

(22) Filed: Mar. 21, 2002

(65) Prior Publication Data
US 2002/0145964 A1 Oct. 10, 2002

(30) Foreign Application Priority Data
Apr. 4, 2001 (JP) ........................... 2001-105644

(51) Int. Cl.[7] .............................. G11B 33/02
(52) U.S. Cl. ...................................... 369/75.2
(58) Field of Search ........................ 369/75.1–75.2, 369/77.1–77.2, 178; 360/99.02, 99.06

(56) References Cited

FOREIGN PATENT DOCUMENTS

JP 5-282760 A 10/1993
JP 09147468 A * 6/1997

* cited by examiner

Primary Examiner—Allen Cao
(74) Attorney, Agent, or Firm—Birch, Stewart, Kolasch & Birch, LLP

(57) ABSTRACT

A main chassis supports a tray that carries a disk and slides between a disk-discharging position and a disk-loading position. A drive gear meshes with a first rack formed in the tray to move the tray between the disk-discharging position and disk-discharging position. The tray is in cam engagement with the cam slider such that when the tray reaches a position close to the disk-loading position, the tray causes a second rack formed in the cam slider to move into meshing engagement with the drive gear. When the cam slider is driven to move, a guide groove formed in the cam slider guides the disk-reproducing unit such that the disk-reproducing unit starts moving to the disk-reproducing position only after the cam slider is meshing engagement with the drive gear such that the pitch circle of the drive gear is tangent to the pitch line of the second rack.

5 Claims, 15 Drawing Sheets

DISK-LOADING APPARATUS

BACKGROUND OF THE INVENTION

1. Field of the Invention

The present invention relates to a disk-loading apparatus for loading a CD and a DVD to their reproducing positions, and more particularly to a disk-loading apparatus in which a single motor is used to move a disk-carrying tray and to rotate a drive chassis that carries a recording-and-reproducing unit having a pick-up.

2. Description of the Related Art

FIG. 10 is a top view of a conventional disk-loading apparatus when a tray is at a disk-discharging position.

Referring to FIG. 10, a main chassis 2 supports a tray 3 thereon such that when the tray 3 is driven to move between a disk-loading position (FIG. 13) and a disk-discharging position (FIG. 10), guides 2a–2f guide the tray 3 to slide on the main chassis 2. The tray 3 has a disk-carrying surface 3d on which a disk, not shown, is placed. The tray 3 moves into the disk-loading apparatus for loading the disk and out of the disk-loading apparatus for discharging the disk. The tray 3 has a rack 3a formed in an underside on one side of the tray 3. The tray 3 also has generally L-shaped guide grooves 3b and 3c formed in the underside thereof, the guide grooves 3b and 3c guiding bosses 50a and 50b of a cam slider 50, respectively. The main chassis 2 is mounted to a disk-player chassis, not shown, by means of rubber dampers 80, 81, and 82.

FIG. 11 is a perspective view of a pertinent portion of a rotation-transmitting mechanism of a loading motor 122 of FIG. 10.

Referring to FIGS. 10 and 11, the drive gear 120 includes a small gear (pinion) 120a and a large gear 120b. The drive gear 120 is mounted to the main chassis 2 so that the drive gear 120 is rotatable about an axis parallel to a Z-axis and the small gear 120a is in mesh with the rack 3a formed in the tray 3. Likewise, an intermediate drive gear 121 is mounted to the main chassis 2 so that the intermediate gear 121 is rotatable about an axis parallel to a Z-axis. The intermediate drive gear 121 includes a small gear 121a and a disk 121b, the small gear 121a being in mesh with the large gear 120b and the disk 121b having a conical surface 121c.

The loading motor 122 has a friction wheel 123 attached to a shaft thereof, the friction wheel 123 being in the shape of a truncated cone. The shaft of the loading motor 122 extends parallel to the main chassis 2 so that the conical surface 121c of the friction wheel 123 is in pressure contact with the conical surface 121 of the disk 121b. Thus, the rotation of the loading motor 122 is transmitted to the gear 121 through friction engagement of the friction wheel 123 with the disk 121.

The loading motor 122 is mounted on a generally L-shaped mounting member 124 by means of a screw 101. The mounting member 124 is firmly mounted on the main chassis 2 by means of screws 102.

FIG. 12 is a top view of the conventional disk-loading apparatus 1 when the tray is at the disk-loading position.

FIG. 13 is a perspective view that corresponds to FIG. 10.

FIG. 14 is a perspective view that corresponds to FIG. 12.

As shown in FIG. 13, a cam slider 50 is generally L-shaped, and is supported on the main chassis 2 so that the cam slider 50 can slide on a Y-axis. The cam slider 50 has a rack 50c formed in its side portion and bosses 50a and 50b that project upwardly from a top surface of the cam slider 50. The bosses 50a and 50b engage the guide grooves 3b and 3c formed in the underside of the tray 3.

As shown in FIG. 14, the cam slider 50 has a flat portion parallel to a Z-Y plane. Formed in this flat portion is the cam slider 50 having a cam groove 50d along which a later described projection 70a of a drive chassis 70 is guided to move. The cam groove 50d includes a lower end 101b, an upper end 110a, and an inclined portion 101c that connects the lower and upper ends 101b and 101a.

The drive chassis 70 has a pair of bosses 70b and 70c (also see FIG. 15) that are in line with each other and project from opposite sides of the drive chassis 70. The drive chassis 70 is supported at the bosses 70b and 70c on the main chassis 2 and is rotatable about an axis 115 parallel to the Y-axis. The drive chassis 70 has a projection 70a that projects in a direction perpendicular to the axis 115.

The projection 70a loosely extends through the cam groove 50d formed in the cam slider 50. Therefore, when the cam slider 50 moves back and forth along the Y-axis, the drive chassis 70 rotates about the axis 115 in directions shown by arrows A and B. The drive chassis 70 carries a reproducing mechanism that includes an optical pick-up 76 and a turntable 77.

In the disk-loading operation, the tray 3 moves from the position (i.e., disk-discharging position) shown in FIG. 10 to the position (i.e., disk-loading position) shown in FIG. 12 where the optical pick-up 76 reproduces information from the disk.

When the loading motor 122 of FIG. 11 rotates in a direction shown by arrow C, the drive gear 120 rotates about an X-axis in a direction shown by arrow E. The rotation of the drive gear 120 in the E direction is transmitted through the small gear 120a and rack 3a to the tray 3. Thus, the tray 3 moves on the X-axis from the disk-discharging position of FIG. 10 toward the disk-loading position (i.e., toward the origin 0 of X-axis). In other words, the rotation of the loading motor 122 in the C direction causes the tray 3 to slide along the guides 2a–2e, thereby initiating a disk-loading operation.

FIG. 15 illustrates the conventional tray immediately before it reaches the disk-loading position.

When the tray 3 reaches a location very close to the disk-loading position, the bosses 50a and 50b move into engagement with the curved portions of the L-shaped guide grooves 3b and 3c to move the cam slider 50 on the Y-axis in a direction away from the origin O. The movement of the cam slider 50 on the Y-axis causes the rack 50c to move into meshing engagement with the small gear 20a of the drive gear 20. At this time, the rack 3a formed in the underside of the tray 3 is still in mesh with the small gear 20a of the drive gear 20. When the tray 3 has reached the disk-loading position shown in FIG. 12, the rack 3a disengages from the small gear 20a.

The cam slider 50 continues to move on the Y-axis since the rack 50c remains in mesh with the drive gear 20 until the bosses 50a and 50b reach the ends of the guide grooves 3b and 3c of the tray 3, respectively, as shown in FIG. 12. When the bosses reach the ends of the guide grooves 3b and 3c, the cam slider 50 stops moving and the tray 3 completes the disk-loading operation.

The disk-loading operation will be described in more detail with reference to FIGS. 13 and 15.

The projection 70a remains in engagement with the lower end 101b of the cam groove 101 to maintain its inclined position with respect to the disk-carrying surface 3d until the bosses 50a and 50b start moving on the Y-axis in the direction away from the origin O. At this moment, the turn table 77 disposed on the drive chassis 70 has moved downward away from the disk-carrying surface 3d.

Then, as soon as the tray 3 arrives at a location (FIG. 15) near the disk-loading position, the cam slider 50 starts moving on the Y-axis away from the origin O. Thus, the projection 70a of the drive chassis 70 starts engaging the inclined portion 101c of the cam groove 101 formed in the cam slider 50. Thus, the drive chassis 70 rotates about the Y-axis in the direction shown by arrow A. The drive gear 120 continues to rotate in the direction shown by arrow E, so that the rack 50c formed in the cam slider 50 moves into meshing engagement with the small gear 120a of the drive gear 120. Thus, at this moment, the drive gear 120 causes the tray 3 and cam slider 50 to move.

The drive gear 120 continues to rotate in a direction shown by arrow E, so that the tray 3 reaches and stops at the disk-loading position of FIG. 12 where the rack 3a moves out of meshing engagement with the small gear 20a of the drive gear 120. The cam slider 50 still continues to move on the Y-axis in the direction away from the origin O and stops at the position of FIG. 12 where the bosses 50a and 50b reach the ends of the guide grooves 3b and 3c.

When the cam slider 50 moves on the Y-axis in the direction away from the origin O, the projection 70a of the drive chassis 70 is guided by the inclined portion 101c (FIG. 15) to move upwardly and then reach the upper end 110a. The upward movement of the projection 70a causes the drive chassis 70 to rotate through a predetermined angle about the axis 115 in the direction shown by arrow A, to the position of FIG. 15.

When the drive chassis 70 is rotating about the axis 115, the turntable 77 raises the disk, not shown, on the disk-carrying surface 3d of the tray 3 (FIG. 12) to hold the disk sandwiched between the turntable 77 and the clamper 60 on the main chassis 2. Then, the disk is driven in rotation so that the optical pickup 76 reproduces either continuously or intermittently the information recorded on the disk.

With the aforementioned conventional disk-loading apparatus 100, as soon as the rack 50c of the cam slider 50 moves into meshing engagement with the small gear 20a of the drive gear 20, the drive chassis 70 starts rotating to raise the recording and reproducing unit 90. Since the rack 50c has not moved yet into complete meshing engagement with the small gear 20a and the rotation of the drive gear 20 cannot be transmitted properly to the cam slider 50. This operation is disadvantageous in that a large load due to the upward movement of the recording and reproducing unit 90 is exerted on the rack 50c that is still incomplete meshing engagement with the small gear 20a.

Thus, the rack 50c deforms so that the tray 3 is not pulled in smoothly into the apparatus and therefore the recording and reproducing unit 90 cannot move upward smoothly. Unpleasant noise also occurs when the mechanism switches from the pull-in of the tray into the upward movement of the recording and reproducing unit 90.

SUMMARY OF THE INVENTION

The present invention was made to solve the drawbacks of the aforementioned conventional disk-loading apparatus.

Another object of the invention is to provide a disk-loading apparatus that performs reliable disk-inserting and disk-discharging operations.

An object of the invention is to provide a disk-loading apparatus in which a disk-carrying tray can be inserted into and discharged out of the apparatus without making unpleasant noise.

A main chassis supports a tray that carries a disk thereon and slides between a disk-discharging position and a disk-loading position. A drive gear rotatably is mounted on the main chassis. A first rack is formed in the tray and is in meshing engagement with the drive gear when the tray is at the disk-discharging position, and becomes out of meshing engagement with the drive gear when the tray is at the disk-loading position. A cam slider has a second rack formed therein and a guide groove formed therein. The cam slider is movable relative to the main chassis in a first direction such that the second rack moves into engagement with the drive gear, and in a second direction opposite to the first direction such that the second rack moves out of meshing engagement with the drive gear. When the tray has moved to a location very close to the disk-loading position, the second rack starts moving into meshing engagement with the drive gear. The first rack becomes out of meshing engagement with the drive gear before the cam slider has moved into meshing engagement with the drive gear such that a pitch circle of the drive gear is tangent to a pitch line of the second rack. A disk-reproducing unit having an engagement portion that extends slidably into the guide groove. When the cam slider has moved into meshing engagement with the drive gear such that a pitch circle of the drive gear is tangent to a pitch line of the second rack, the engagement portion starts being guided along the guide groove so that the disk-reproducing unit starts rotating in a third direction about an axis to a disk-reproducing position. When the cam slider moves in the second direction, the disk-reproducing unit rotates in a fourth direction opposite to the third direction about the axis to a non-disk-reproducing position.

The engagement portion extends in a fifth direction substantially perpendicular to the axis and the axis extends in a sixth direction parallel to a plane in which the tray moves between the disk-discharging position and the disk-loading position.

The first and second directions are perpendicular to a seventh direction in which the tray moves between the disk-discharging position and the disk-loading position.

The cam slider is in cam engagement with the tray such that when the tray moves toward the disk-loading position, the second rack is brought into meshing engagement with the drive gear.

The guide groove guides the engagement portion of the disk-reproducing unit such that the disk-reproducing unit starts rotating to the disk-reproducing position, only after the pitch circle of the drive gear is tangent to the pitch line of the second rack.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Embodiment

Throughout the figures, an X-axis represents the direction of movement of a tray 3 and a Y-axis represents the direction parallel to a disk-carrying surface 3d of the tray 3. The Y-axis is perpendicular to the X-axis. A Z-axis represents a direction perpendicular to the X-axis and Y-axis.

Figure 2:
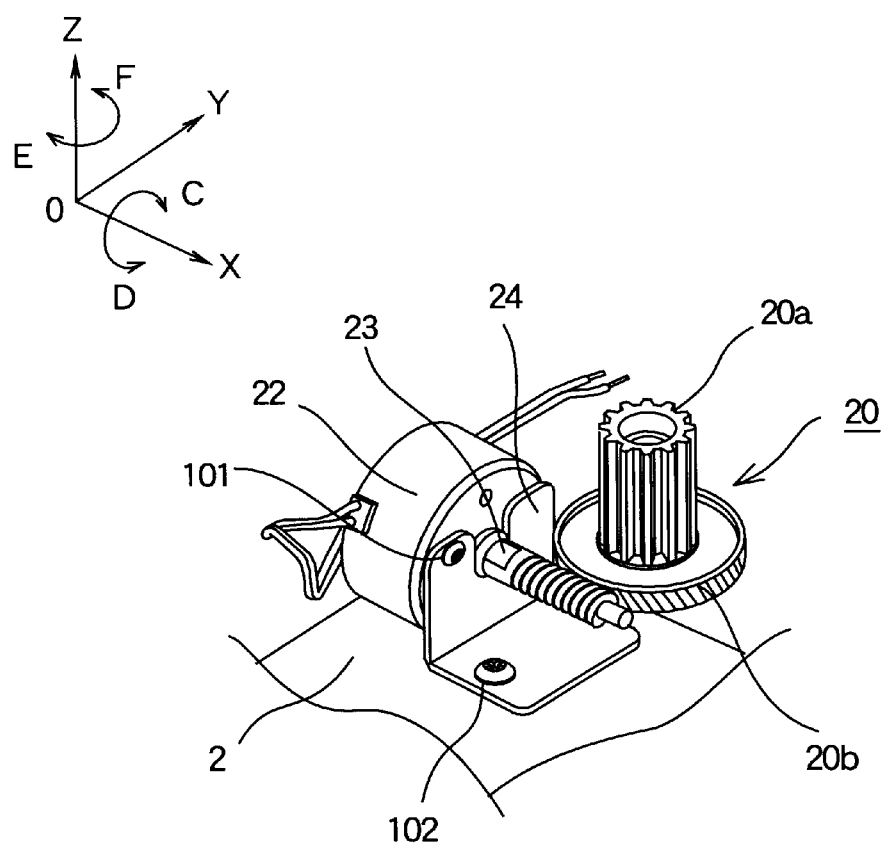
FIG. 2 is a perspective view of a configuration of a part of a rotation-transmitting mechanism that transmits the rotation of a loading motor.

The disk-loading apparatus 1 according to the invention differs from the conventional apparatus 100 in the configuration of a rotation-transmitting mechanism that transmits the rotation of the loading motor 22 of FIG. 2 and the shape of a cam groove 51 (FIG. 6) formed in a slide plate 50.

Figure 1:
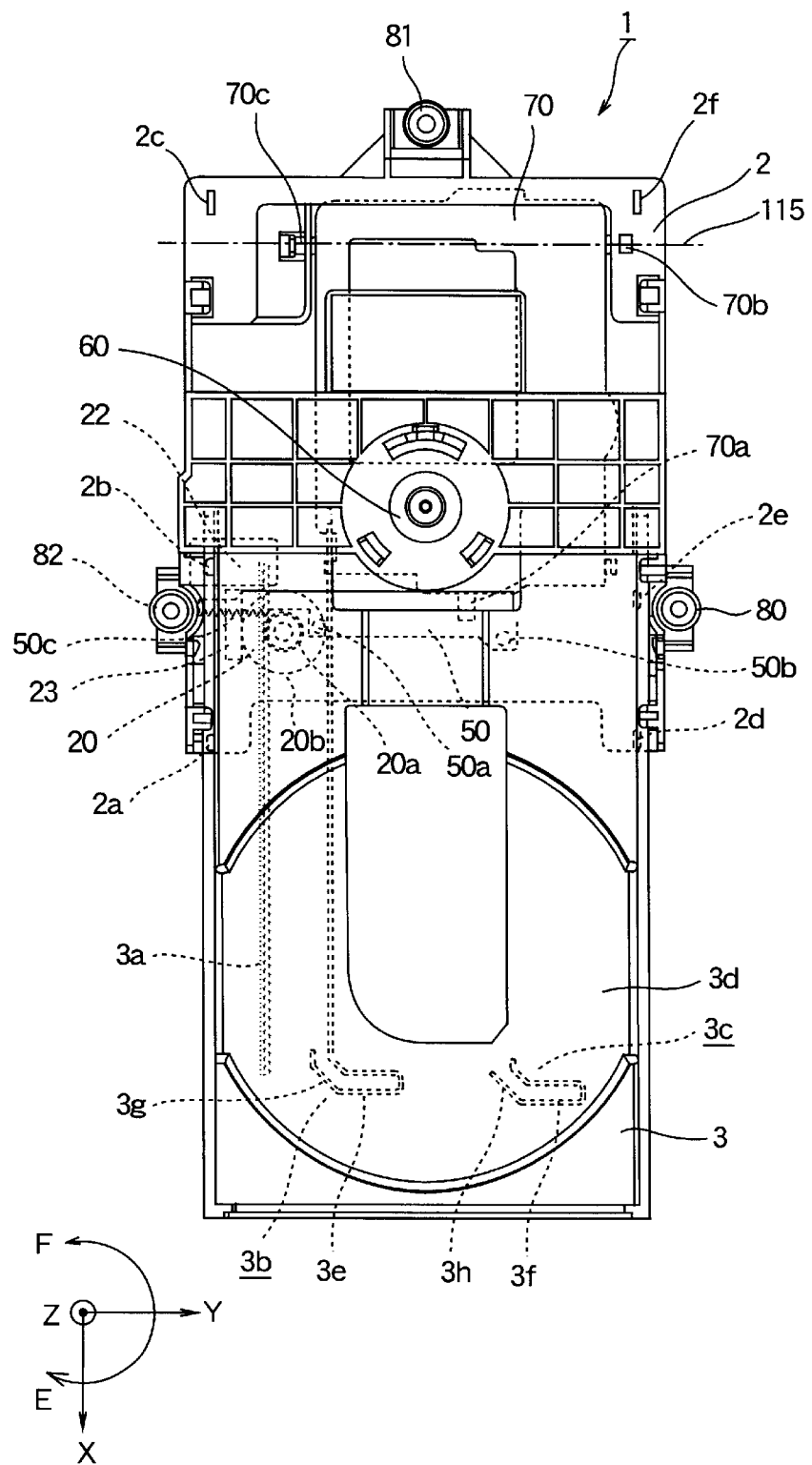
FIG. 1 is a top view illustrating the configuration of a disk-loading apparatus according to the invention.

FIG. 1 is a top view illustrating the disk-loading apparatus 1 when the tray 3 is at a disk-discharging position.

FIG. 2 is a perspective view of a rotation-transmitting mechanism that transmits the rotation of a loading motor 22.

When the tray 3 moves from a disk-discharging position (FIG. 1) to a disk-loading position (FIG. 4) and then an optical pick-up 76 (FIG. 5) reproduces information from a disk placed on the tray 3, the disk-loading apparatus 1 of the aforementioned construction operates in the same way as the conventional disk-loading apparatus 100. Thus, the embodiment will be described in detail with respect to a portion different from that of the conventional apparatus 100, and briefly with respect to a portion common to the conventional apparatus 100 and the apparatus 1 of the invention.

Referring to FIGS. 1 and 2, the drive gear 20 includes a small gear (pinion) 20a and a worm wheel 20b. The drive gear is mounted to the main chassis 2 in such a way that the drive gear 20 is rotatable about an axis parallel to the Z-axis and the small gear 20a is in mesh with the rack 3a. The loading motor 22 has a shaft that extends in a direction parallel to the X-axis. The shaft has a worm 23 that is formed thereon and is in mesh with the worm wheel 20b. The worm 23 and worm wheel 20b form a worm gear mechanism through which the loading motor 22 drives the drive gear 20.

The drive gear 20 is driven in rotation by the loading motor 22, thereby causing the tray 3 to move on the Y-axis. As described above, the disk-loading apparatus 1 of FIG. 1 uses the worm 23 and drive gear 20 to transmit the rotation of the loading motor 22 while the conventional disk-loading apparatus 100 (FIG. 9) uses the friction wheel 123, intermediate gear 121, and drive gear 120.

When the loading motor 22 of FIG. 2 rotates in a direction shown by arrow C, the drive gear 20 rotates in a direction shown by arrow E. The rotation of the drive gear 20 in the E direction is transmitted through the worm gear mechanism so that the tray 3 moves on the X-axis from the disk-discharging position of FIG. 1 toward the disk-loading position (i.e., toward the origin O of X axis of FIG. 1). In other words, the rotation of the loading motor 22 in the C direction causes the tray 3 to slide along the guides 2a–2e, thereby initiating a disk-loading operation.

At this moment, the rotation of the loading motor 22 is greatly reduced through the worm 23 and the worm wheel 20b so that the drive gear 20 rotates at a low speed. Thus, the tray 3 moves into the apparatus quietly without making any noticeable noise.

Figure 3:
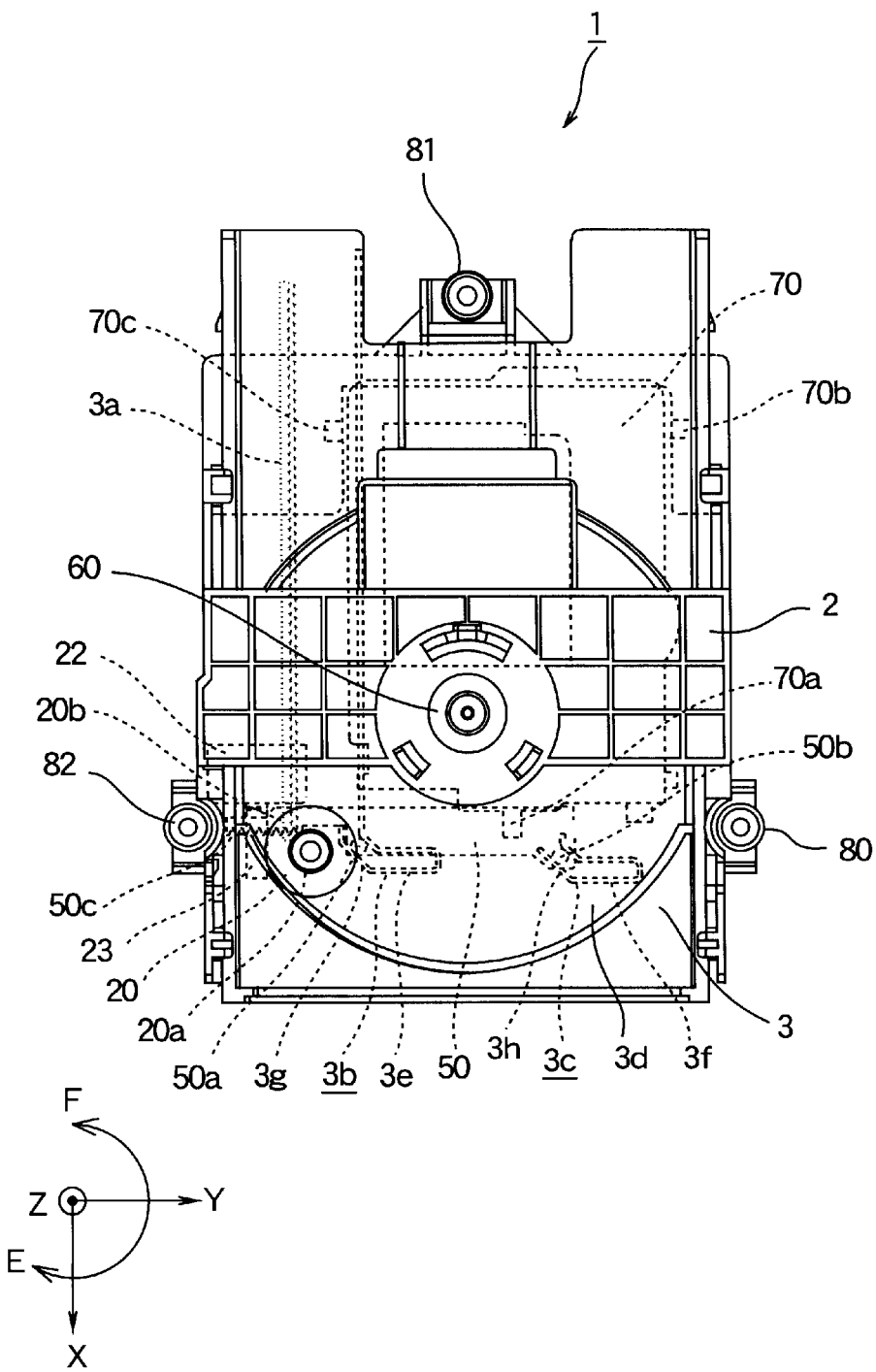
FIG. 3 is a top view illustrating a position of the tray relative to the main chassis when the tray has reached a position close to the disk-loading position.

FIG. 3 is a top view illustrating a position of the tray 3 relative to the main chassis 2 when the tray 3 has reached a position close to the disk-loading position.

When the tray 3 reaches a location of FIG. 3 that is very close to the disk-loading position (FIG. 4), the bosses 50a and 50b of the cam slider 50 move into engagement with the oblique portions 3g and 3h of the L-shaped guide grooves 3b and 3c of the tray 3, respectively, so that the cam slider 50 moves on the Y-axis away from the origin O. The movement of the cam slider 50 on the Y-axis causes the rack 50c to move into meshing engagement with the small gear 20a of the drive gear 20. At this time, the rack 3a formed in the underside of the tray 3 is still in mesh with the small gear 20a of the drive gear 20, but disengages from the small gear 20a when the tray 3 has reached the loading position (FIG. 4).

Figure 4:
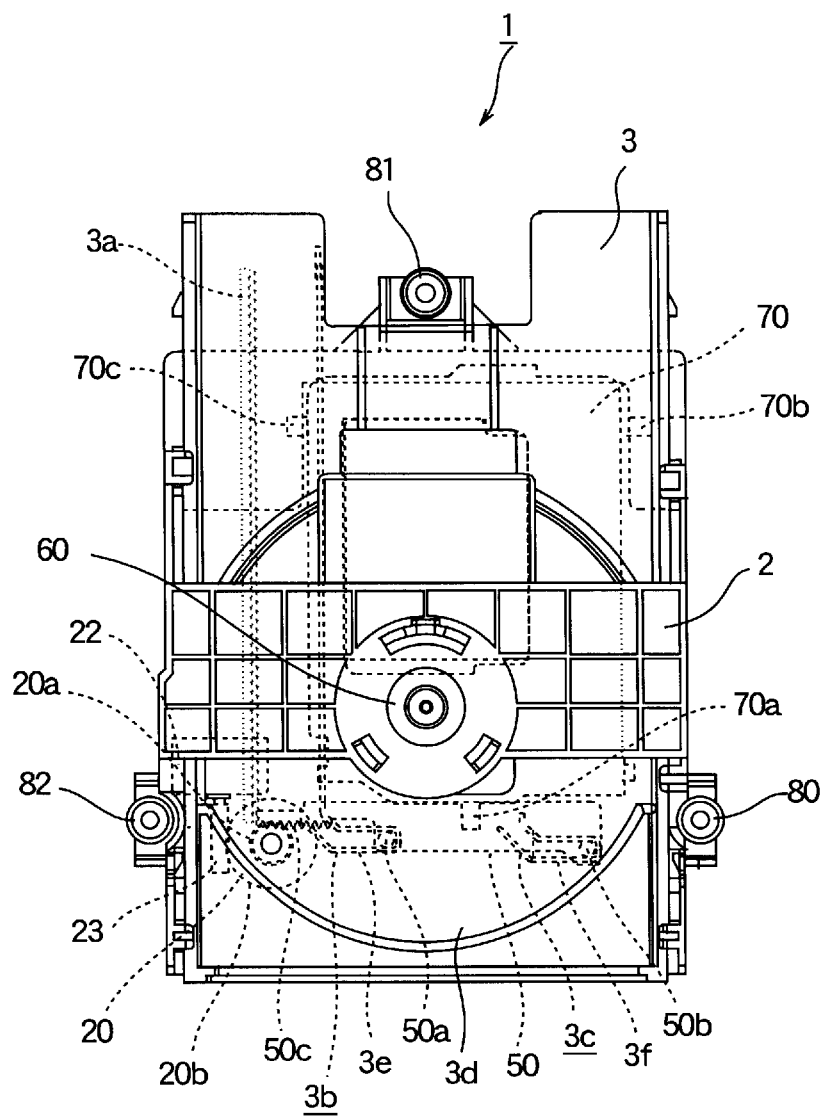
FIG. 4 is a top view illustrating the tray when the tray has reached the disk-loading position.

FIG. 4 is a top view illustrating the tray 3 when the tray 3 has reached the disk-loading position.

The rack 50c is in mesh with the small gear 20a of the drive gear 20 so that the cam slider 50 continues to move on the Y-axis in a direction away from the origin O. When the bosses 50a and 50b are driven to the ends of the guide grooves 3b and 3c of the trays 3, respectively, the loading motor 22 stops rotating and therefore the cam slider 50c stops moving.

Figure 5:
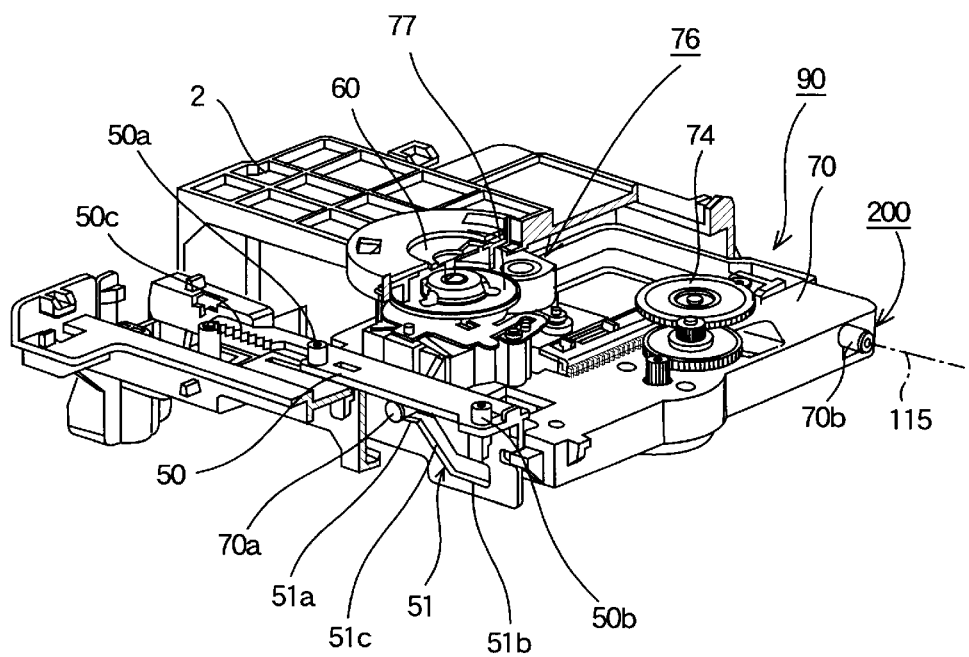
FIG. 5 is a perspective cut-away view of the disk-loading apparatus, corresponding to FIG. 4.
Figure 5:
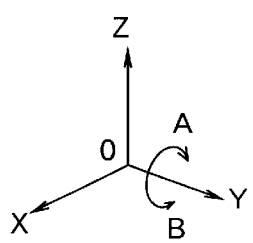

FIG. 5 is a perspective view, partially cut-away, of the disk-loading apparatus 1 when the tray 3 is at the disk-loading position.

As described later, the cam slider 50 has a cam groove 51 with a lower end portion 51b and an inclined portion shaped such that a projection 70a of a drive chassis 70 is guided in a different way from the cam groove 101 of the conventional disk-loading apparatus 100. The specific shape of the cam groove 51 will be described later.

{Operation}

A description will be given of the operation of the disk-loading apparatus 1 in which the tray 3 moves from a position (FIG. 3) very close to the disk-loading position to the disk-loading position of FIG. 4.

Figure 6:
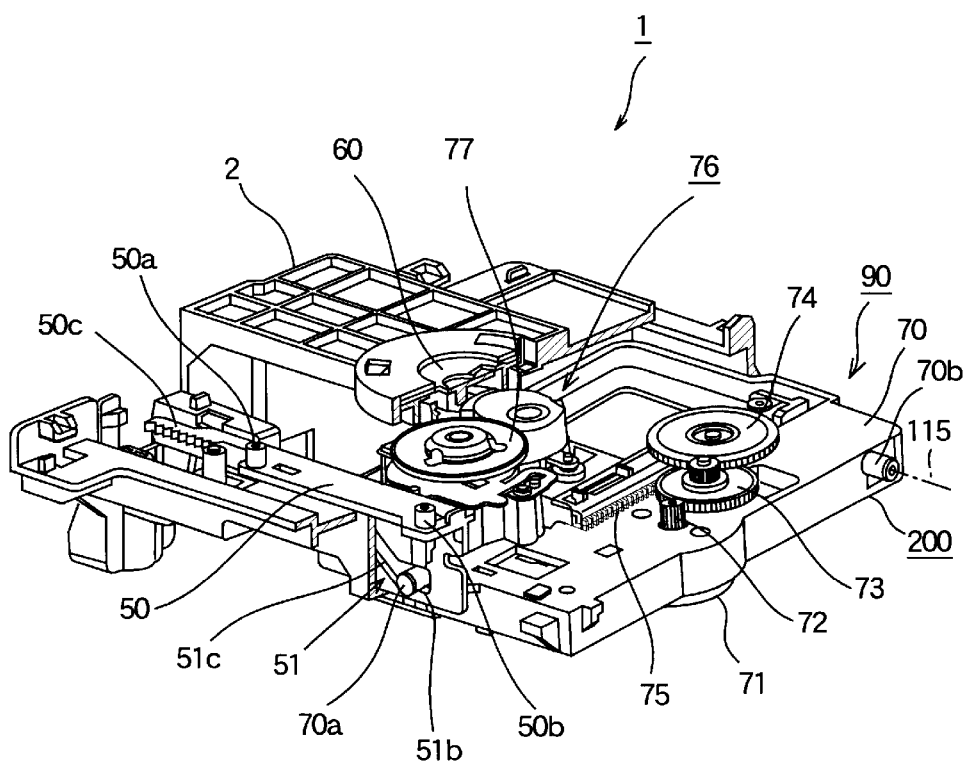
FIG. 6 is a perspective cut-away view of the disk-loading apparatus, corresponding to FIG. 1.
Figure 6:
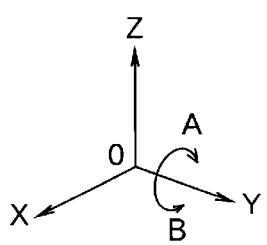

FIG. 6 is a perspective view, partially cut-away, of the disk-loading apparatus 1 of FIG. 1.

Figure 7:
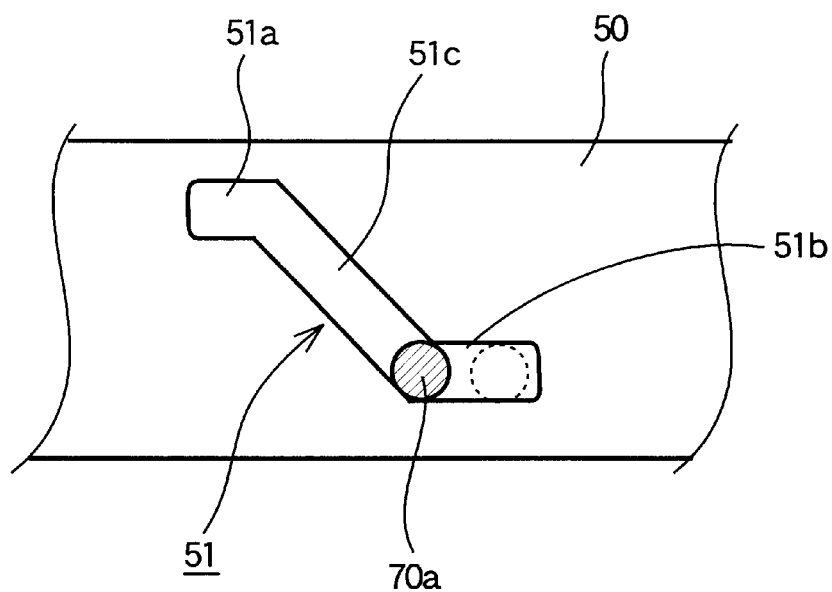
FIG. 7 illustrates the engagement of the cam groove formed in the cam slider with the projection of the drive chassis.
Figure 7:
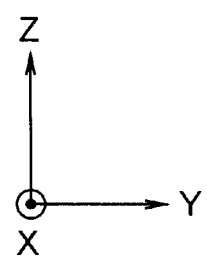

FIG. 7 illustrates the engagement of the cam groove 51 formed in the cam slider 50 with the projection 70a of the drive chassis 70.

Figure 8:
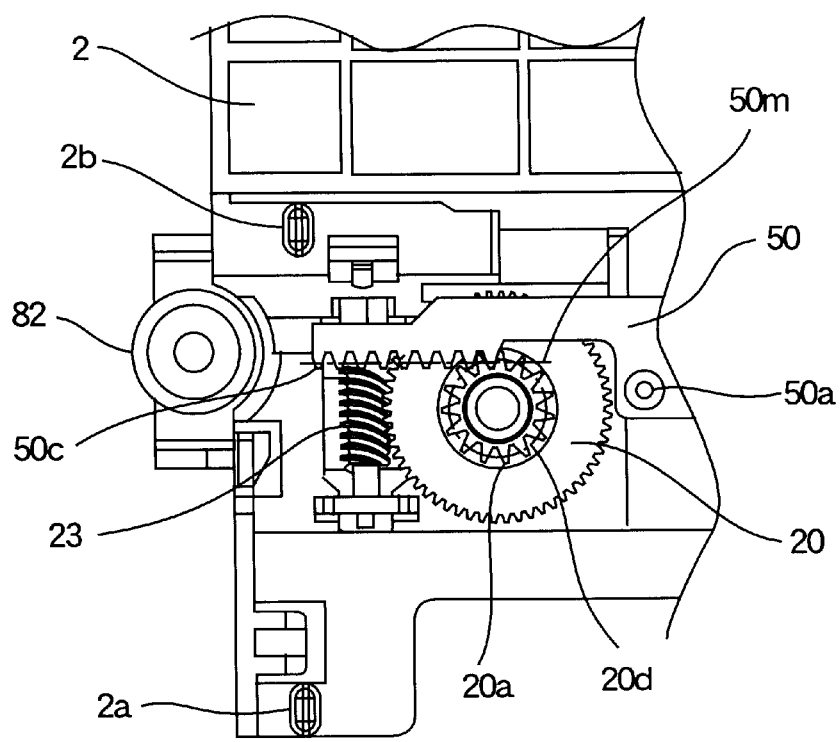
FIG. 8 illustrates the engagement of the small gear of the drive gear with the rack of the cam slider.
Figure 8:
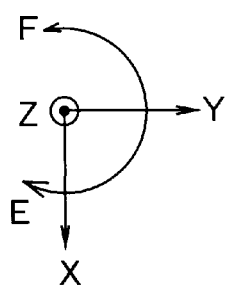

FIG. 8 illustrates the engagement of the small gear 20a of the drive gear 20 with the rack 50c of the cam slider 50.

Figure 9:
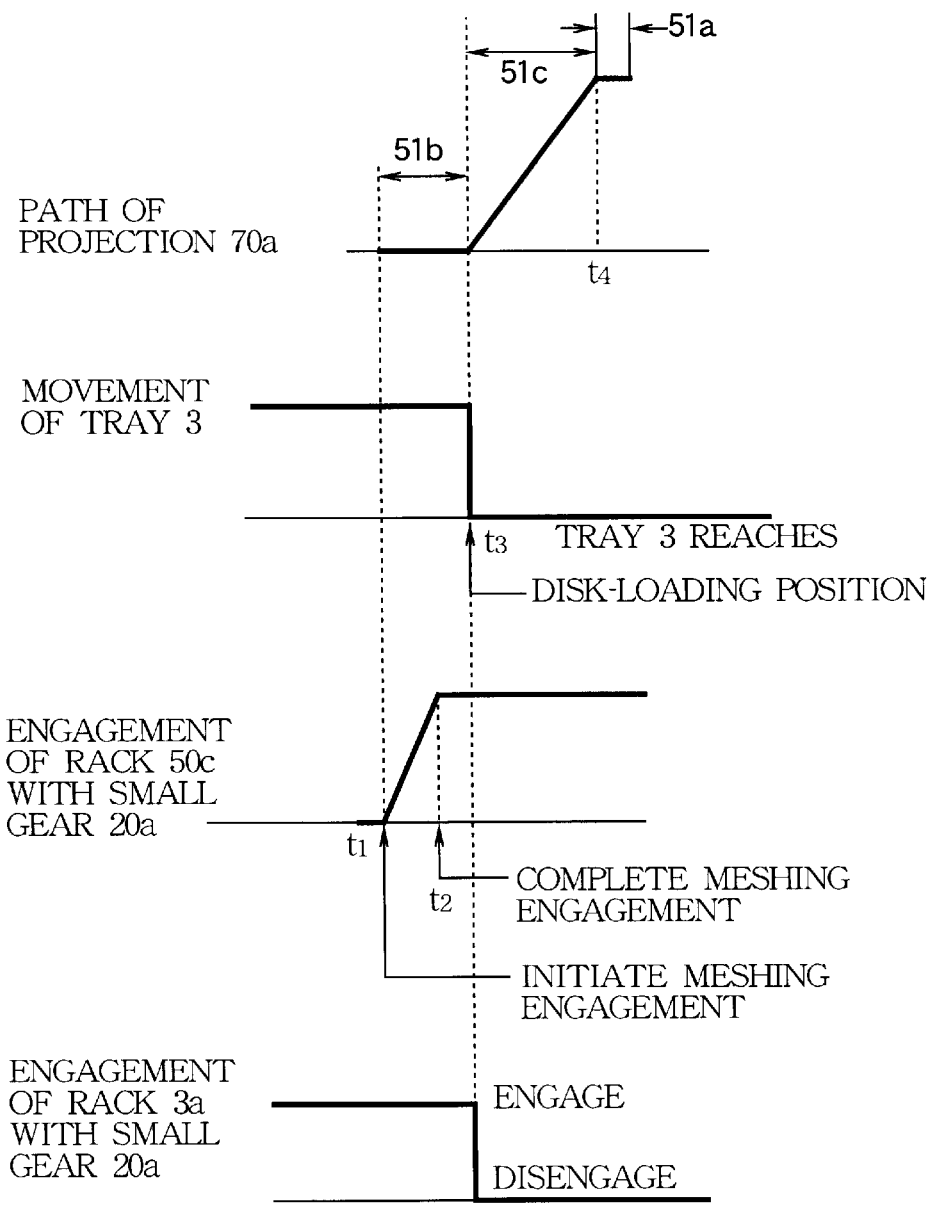
FIG. 9 is a timing chart illustrating timings at which the rack and associated structural elements engage one another.
Figure 10:
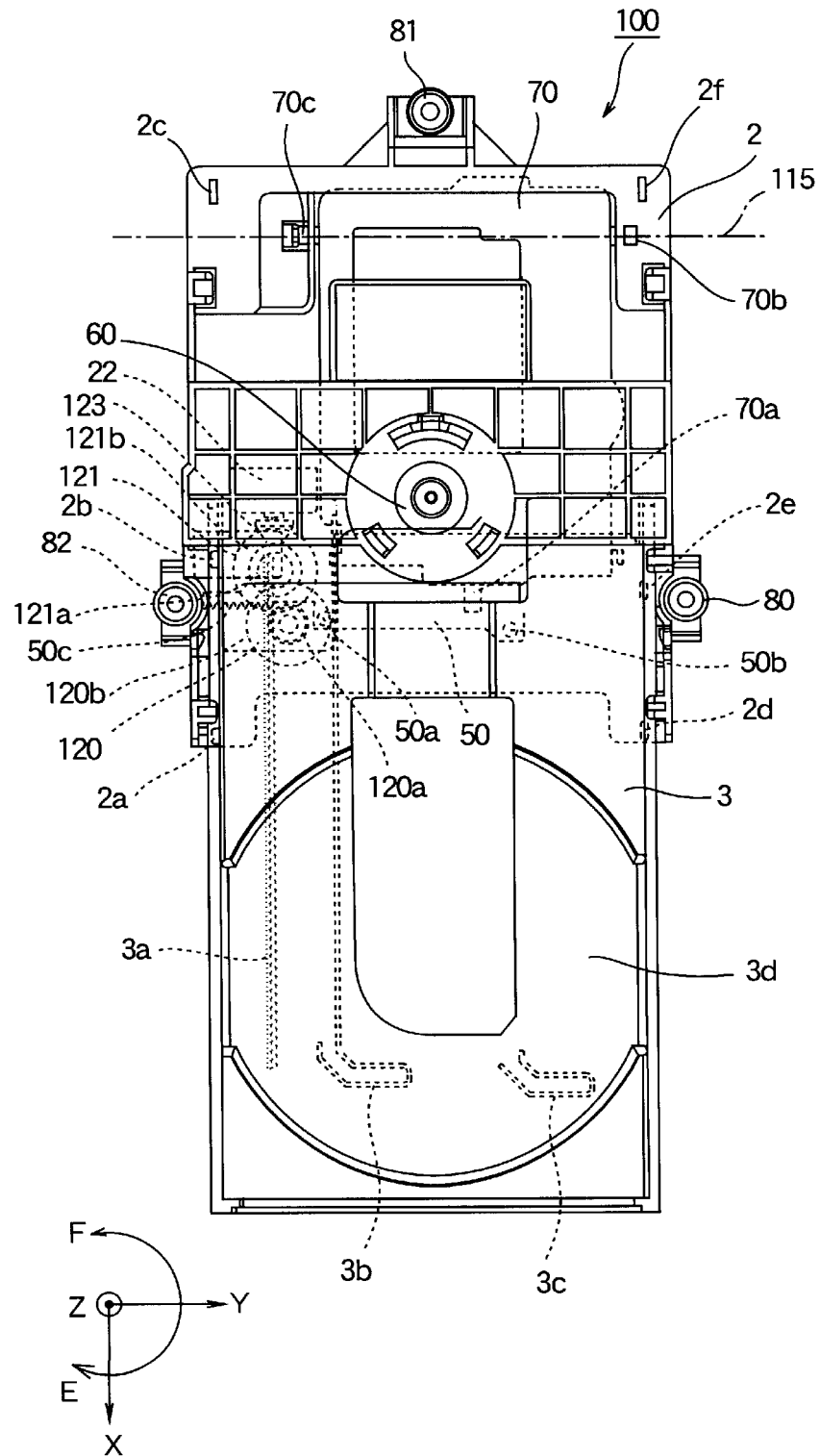
FIG. 10 is a top view of a conventional disk-loading apparatus.
Figure 11:
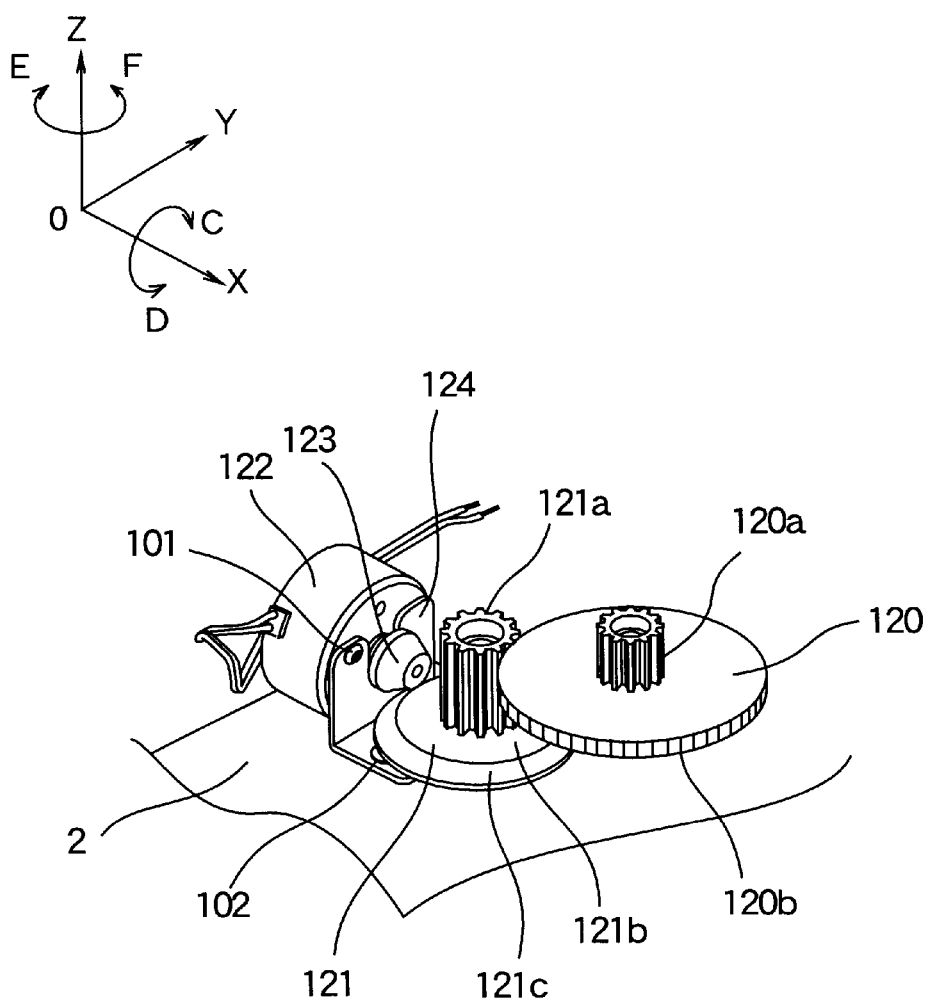
FIG. 11 is a perspective view of a pertinent portion of a rotation-transmitting mechanism of a loading motor of FIG. 10.
Figure 12:
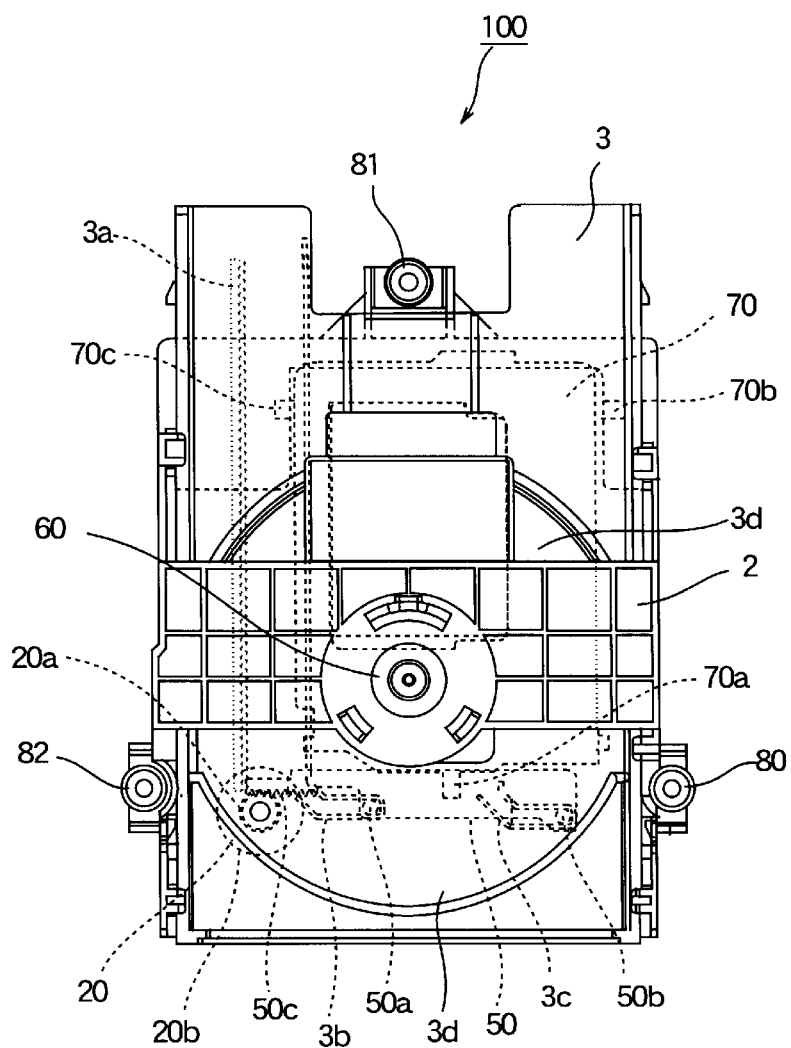
FIG. 12 illustrates the conventional tray when it has reached the disk-loading position.
Figure 12:
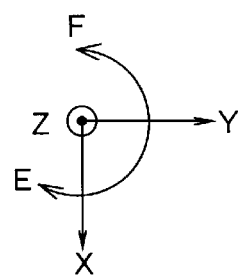
Figure 13:
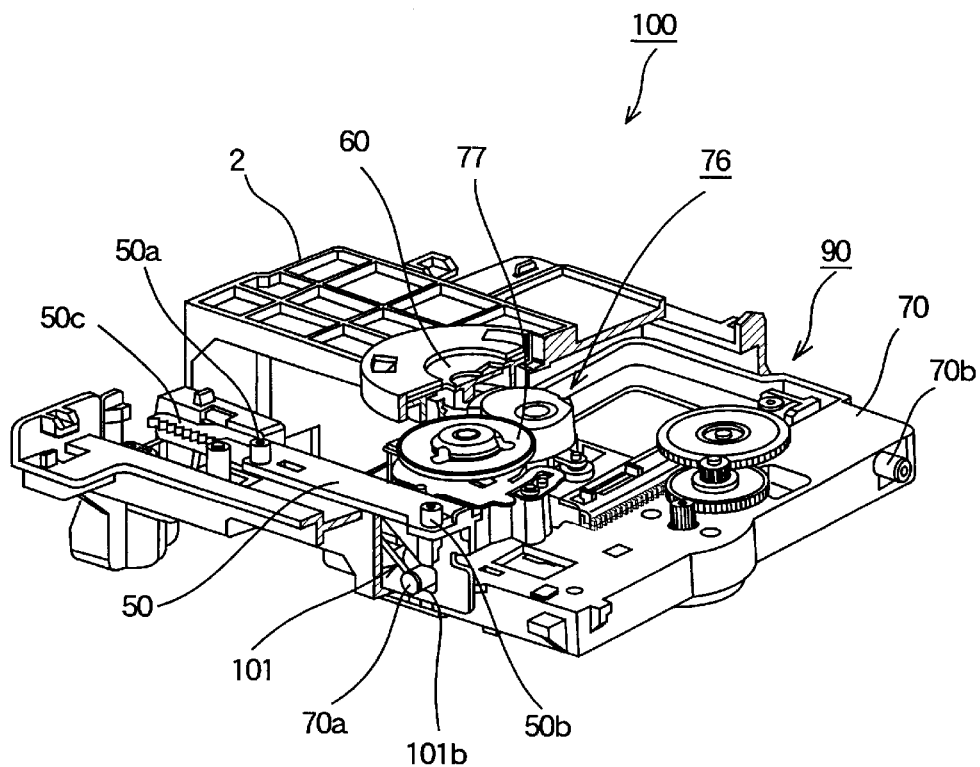
FIG. 13 is a perspective view that corresponds to FIG. 10.
Figure 13:
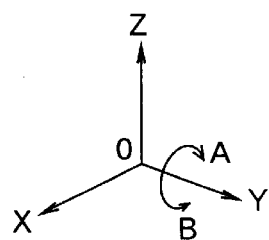
Figure 14:
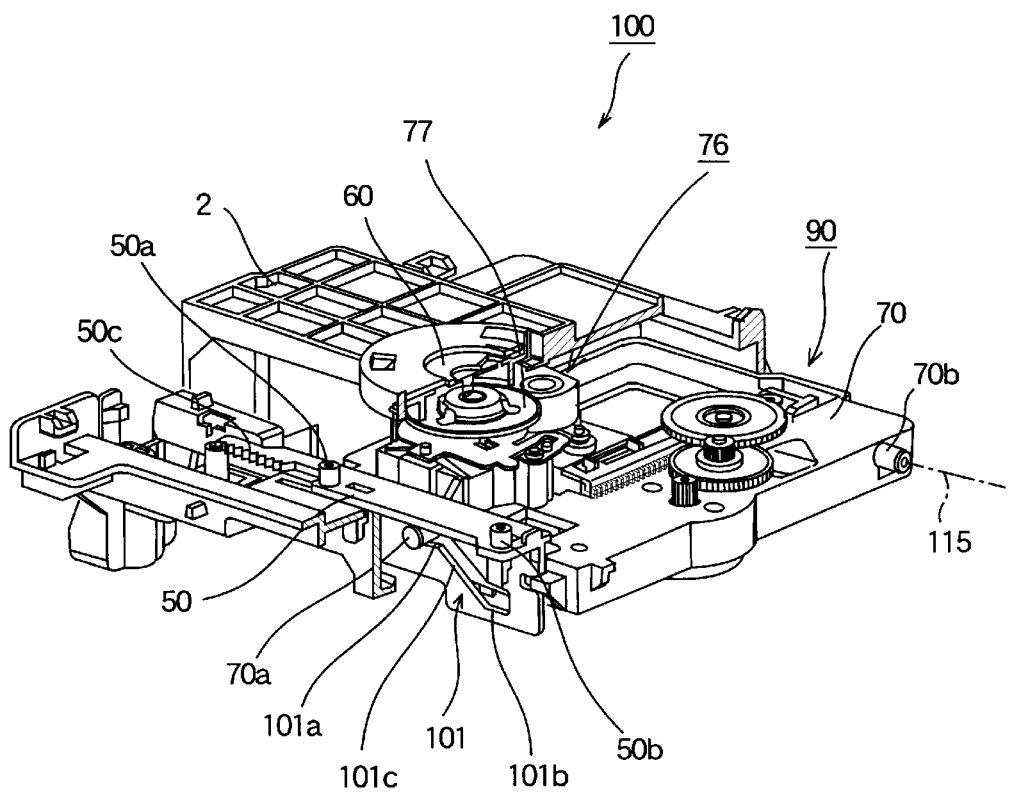
FIG. 14 is a perspective view that corresponds to FIG. 12.
Figure 14:
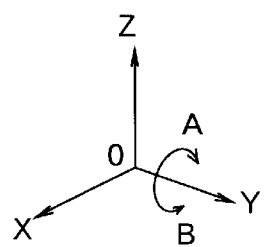
Figure 15:
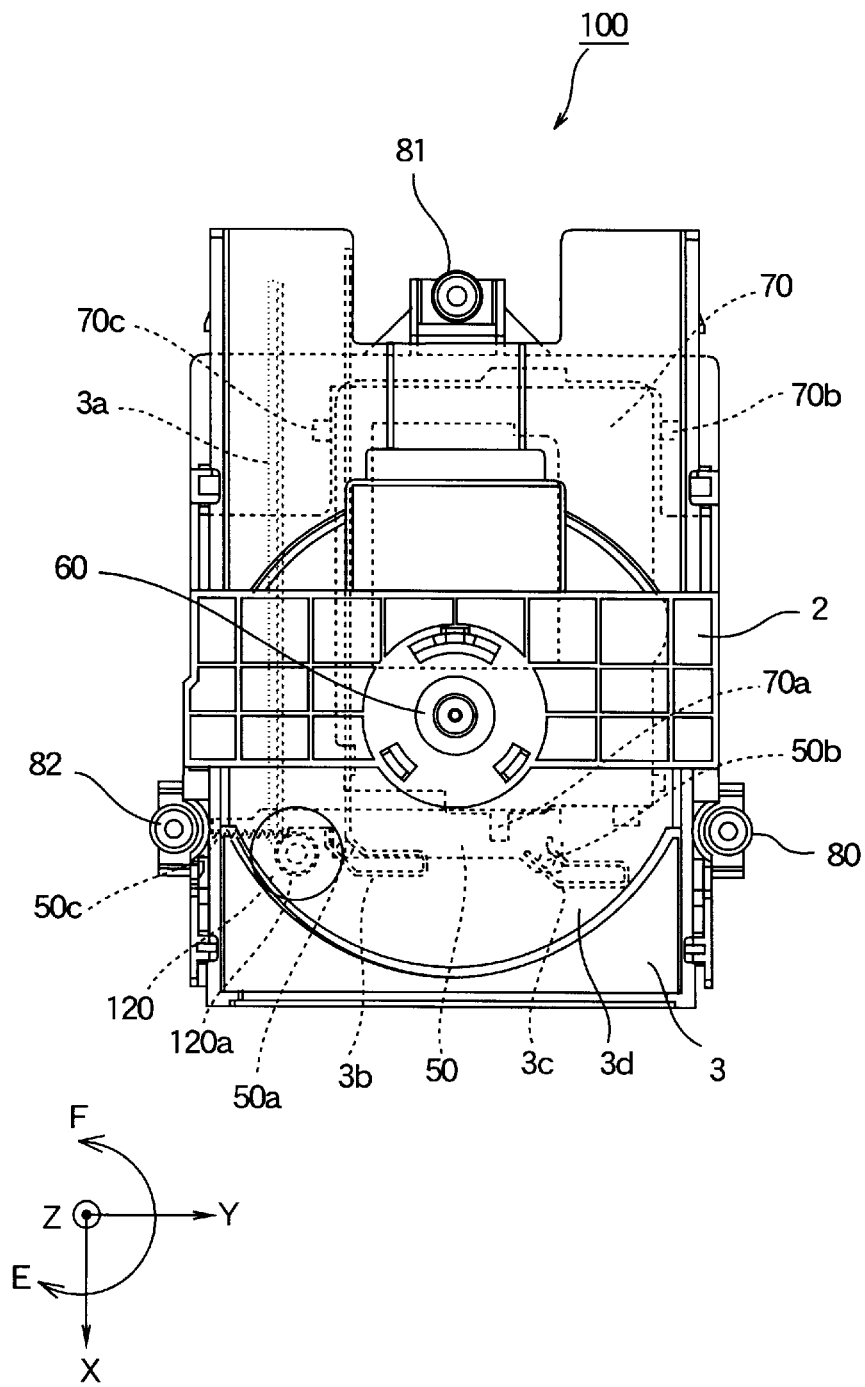
FIG. 15 illustrates the conventional tray immediately before it reaches the disk-loading position.

FIG. 9 is a timing chart illustrating timings at which the rack 50c and associated mechanical elements engage one another.

As shown in FIG. 6, the projection 70a remains positioned at the lower end portion 51b, thereby maintaining its inclined position with respect to the disk-carrying surface 3d until the bosses 50a and 50b enter oblique portions 3g and 3h as shown in FIG. 3, respectively. As soon as the bosses 50a and 50b enter the oblique portions 3g and 3h, respectively, the oblique portions 3g and 3h guide the bosses 50a and 50b so that cam slider 50 starts moving on the Y-axis in a direction away from the origin O. As shown in FIG. 7, the lower end portion 51b of the guide groove 51 is somewhat longer than the upper end portion 51a. It is to be noted that the cam slider 50 starts moving at time t1 (FIG. 9) on the Y-axis and the projection 70a is guided along the lower portion 51b toward the lower end of the inclined portion 51c but does not enter the inclined portion 51c yet.

Therefore, when the projection 70a is being guided along the lower portion 51b (times t1–t3 of FIG. 9), the drive chassis 70 does not rotate about the axis 115 yet, so that a recording-and-reproducing unit 90 remains positioned such that a turntable 77 mounted on the drive chassis 70 is under the disk-carrying surface 3d.

As the bosses 50a and 50b are guided by the oblique portions 3g and 3h, respectively, on the Y-axis in the direction away from the origin O, the rack 50c moves into complete meshing engagement (FIG. 8) with the small gear 20a at time t2 (FIG. 9). As shown in FIG. 8, It is to be noted that when the pitch line 50m of the rack 50c has become tangent to the pitch circle 20d of the small gear 20a.

Shortly after the rack 50c and small gear 20a have moved into complete meshing engagement with each other as shown in FIG. 8, the tray 3 reaches the disk-loading position. When the tray 3 reaches the disk-loading position, the small gear 20a moves out of engagement with the rack 3a, and the bosses 50a and 50b enter short portions 3e and 3f of the guide groove 3a and 3b, respectively. Thus, after time t3 (FIG. 9), the small gear 20a drives only the rack 50c. As shown in FIG. 7, the projection 70a of the drive chassis 70 now reaches the lower end of the inclined portion 51c and the projection 70a is about to climb up the inclined portion 51c of the guide groove 51. At this moment, the drive chassis 70 has not started rotating yet.

The drive gear 20 further continues to rotate in the direction shown by arrow E (FIG. 8) so that the cam slider 50 continues to move on the Y-axis from the origin 0. As a result, the projection 70a of the drive chassis 70 enters the inclined portion 51c of the cam groove 51 shortly after time t3, initiating to move upward obliquely toward the upper end portion 51a so that the drive chassis 70 starts rotating about the axis 115 in the direction shown by arrow A. The drive gear 20 still continues to rotate in the direction shown by arrow E so that the projection 70a passes the inclined portion 51c to reach the upper end portion 51b at time t4. When the projection 70a reaches the upper end portion 51b, the drive chassis 70 stops rotating about the axis 115 and is positioned in place as shown in FIG. 5.

The rotation of the drive chassis 70 causes the turntable 77 to push up the disk placed on the disk-carrying surface 3d of the tray 3, so that the disk abuts a damper 60 on the main chassis 2 to be sandwiched between the damper 60 and the turntable 77. Thus, the disk becomes ready to rotate for reproduction the information.

This complete the disk-loading operation of the tray 3 and the optical pick-up 76 reproduces either continuously or intermittently the information recorded on the disk.

When the tray 3 is to be moved back to the disk-discharging position of FIG. 1, the loading motor 22 rotates a reverse direction, i.e., in the direction shown by arrow D (FIG. 2) so that the aforementioned mechanical movements are carried out in the reverse order. Such reversed operations can be understood without difficulty and therefore the description thereof is omitted.

According to the embodiment of a disk-loading apparatus, when the drive chassis 70 of the recording-and-reproducing unit 90 starts moving upward, the drive load on the cam slider 50 increases. At this moment, the small gear 20a of the drive gear 20 has been in complete meshing engagement with the rack 50c of the cam slider 50 so that the rotation of the drive gear 20 is efficiently converted into a drive force for driving the cam slider 50.

The aforementioned operation prevents the rack 50c of the cam slider 50 from being deformed, thereby allowing the tray 3 to be pulled smoothly into the apparatus and then the recording-and-reproducing unit 90 to move upward. The aforementioned operation also prevents unpleasant noise that otherwise results from deformation of the rack 50c.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A disk-loading apparatus in which a main chassis supports a tray that carries a disk thereon and slides between a disk-discharging position and a disk-loading position, the apparatus comprising:

a drive gear rotatably mounted on the main chassis;

a first rack formed in the tray, said first rack being in meshing engagement with said drive gear when the tray is at the disk-discharging position and becoming out of meshing engagement with said drive gear when the tray is at the disk-loading position;

a cam slider having a second rack formed therein and a guide groove formed therein, said cam slider being movable relative to the main chassis in a first direction such that the second rack moves into engagement with said drive gear and in a second direction opposite to the first direction such that the second rack moves out of meshing engagement with said drive gear, wherein when the tray has moved to a location very close to the disk-loading position, the second rack starts moving into meshing engagement with said drive gear;

wherein said first rack becomes out of meshing engagement with said drive gear before said cam slider has moved into meshing engagement with said drive gear such that a pitch circle of said drive gear is tangent to a pitch line of the second rack;

a disk-reproducing unit having an engagement portion that extends slidably into the guide groove;

wherein when said cam slider has moved into meshing engagement with said drive gear such that a pitch circle of said drive gear is tangent to a pitch line of the second rack, the engagement portion starts being guided along the guide groove so that said disk-reproducing unit starts rotating in a third direction about an axis to a disk-reproducing position;

wherein when said cam slider moves in the second direction, said disk-reproducing unit rotates in a fourth direction opposite to the third direction about the axis to a non-disk-reproducing position.

2. The apparatus according to claim 1, wherein the engagement portion extends in a fifth direction substantially perpendicular to the axis and the axis extends in a sixth direction parallel to a plane in which the tray moves between the disk-discharging position and the disk-loading position.

3. The apparatus according to claim 1, wherein the first and second directions are perpendicular to a seventh direction in which the tray moves between the disk-discharging position and the disk-loading position.

4. The apparatus according to claim 1, wherein said cam slider is movable into cam engagement with the tray such that when the tray moves toward the disk-loading position, the second rack is brought into meshing engagement with said drive gear.

5. The apparatus according to claim 1, wherein the guide groove guides the engagement portion such that said disk-reproducing unit starts rotating to the disk-reproducing position only after said cam slider has moved into meshing engagement with said drive gear such that the pitch circle of said drive gear is tangent to the pitch line of the second rack.

* * * * *